United States Patent [19]

Lohrbach

[11] Patent Number: 4,901,314
[45] Date of Patent: Feb. 13, 1990

[54] FAILSOFT RADIO CONTROL CONSOLE
[75] Inventor: Jeffrey G. Lohrbach, Elgin, Ill.
[73] Assignee: Motorola, Inc., Schaumburg, Ill.
[21] Appl. No.: 213,408
[22] Filed: Jun. 30, 1988
[51] Int. Cl.[4] ............................................. G06F 11/20
[52] U.S. Cl. ................................ 371/11.2; 340/825.5;
370/16; 455/17; 455/8
[58] Field of Search ................................... 371/7, 11, 9;
340/825.5, 825.51, 825.03, 825.06, 825.16;
370/16, 17, 97, 89; 455/8, 17; 364/187

[56] References Cited
U.S. PATENT DOCUMENTS
4,709,365 11/1987 Beale ....................................... 371/11
4,803,681 2/1989 Takahashi ..................... 340/825.5 X Primary Examiner—Jerry Smith
Assistant Examiner—Robert W. Beausoliel
Attorney, Agent, or Firm—Steven G. Parmelee

[57] ABSTRACT

A method and apparatus for allowing a radio control console to failsoft to a predetermined channel assignment plan, without disrupting emergency calls then in progress, upon the failure of a CAD host computer link that would ordinarily provide control signals to the console. Channels are deassigned unless they are supporting an emergency call, and then reassigned to a default assignment. If the reassignment would cause a duplicate assignment, the duplicate assignment is first deassigned prior to making the new default assignment.

12 Claims, 3 Drawing Sheets

FAILSOFT RADIO CONTROL CONSOLE

TECHNICAL FIELD

This invention relates generally to radio control consoles, and particularly to radio control consoles that are coupled to a CAD host computer.

BACKGROUND ART

Radio control consoles are known in the art. Such consoles provide a means for a dispatcher to control a plurality of communication paths, such as RF frequencies used by various radio transceivers to communicate with one another and to the dispatcher.

Computer aided dispatch (CAD) systems are also known. Such devices allow a computer to provide control signals to a radio control console, and thereby allow at least some computer control of the assignment, monitoring and the like of the communication paths.

Occasionally, the CAD computer host, or the link that connects it to the console, may fail. When this occurs, the control signals provided to the console terminate. A need exists for a means of returning and/or maintaining the radio control console, and in particular the communication paths controlled thereby, in a useful and usable state. Particular care must be taken to ensure that necessary communications are neither impeded nor terminated.

SUMMARY OF THE INVENTION

These needs and others are substantially met through the failsoft radio control console disclosed herein. This device provides a means of responding to a fault in the provision of control signals from the CAD host computer to the console. In particular, the invention includes a default mechanism responsive to detection of this predetermined event by causing the console to control the communication paths in a predetermined matter. For example, each communication path control mechanism can have a default assignment assigned thereto, which default assignment becomes effective during a fault condition.

Importantly, the invention will not immediately reassign or restructure any communication paths that are supporting communications having a predetermined priority at the time of the fault. For example, emergency calls are allowed to continue until terminated in ordinary course. Following ordinary termination of the call, the invention then provides for default reassignment of the channel.

In one embodiment, the device also ensures that channel control modules (CCM), prior to reassignment to a default condition, are not being reassigned to a communications path that has already been assigned to another channel control module in ordinary course prior to the fault condition. When such a situation exists, the device first deassigns the duplicate channel control module, and then assigns the channel control module in question to its appropriate default condition. Again, if the device determines that the duplicate channel control module supports an emergency call, neither the duplicate CCM will be deassigned, nor will the first CCM be reassigned to its default condition until the emergency call has been terminated in ordinary course.

In yet another embodiment, the failure mode can be purposely initiated by the CAD host computer, and completion of the failsoft reassignment routine acknowledged by the console through provision of an appropriate acknowledgment signal to the CAD host computer.

BEST MODE FOR CARRYING OUT THE INVENTION

Figure 1:
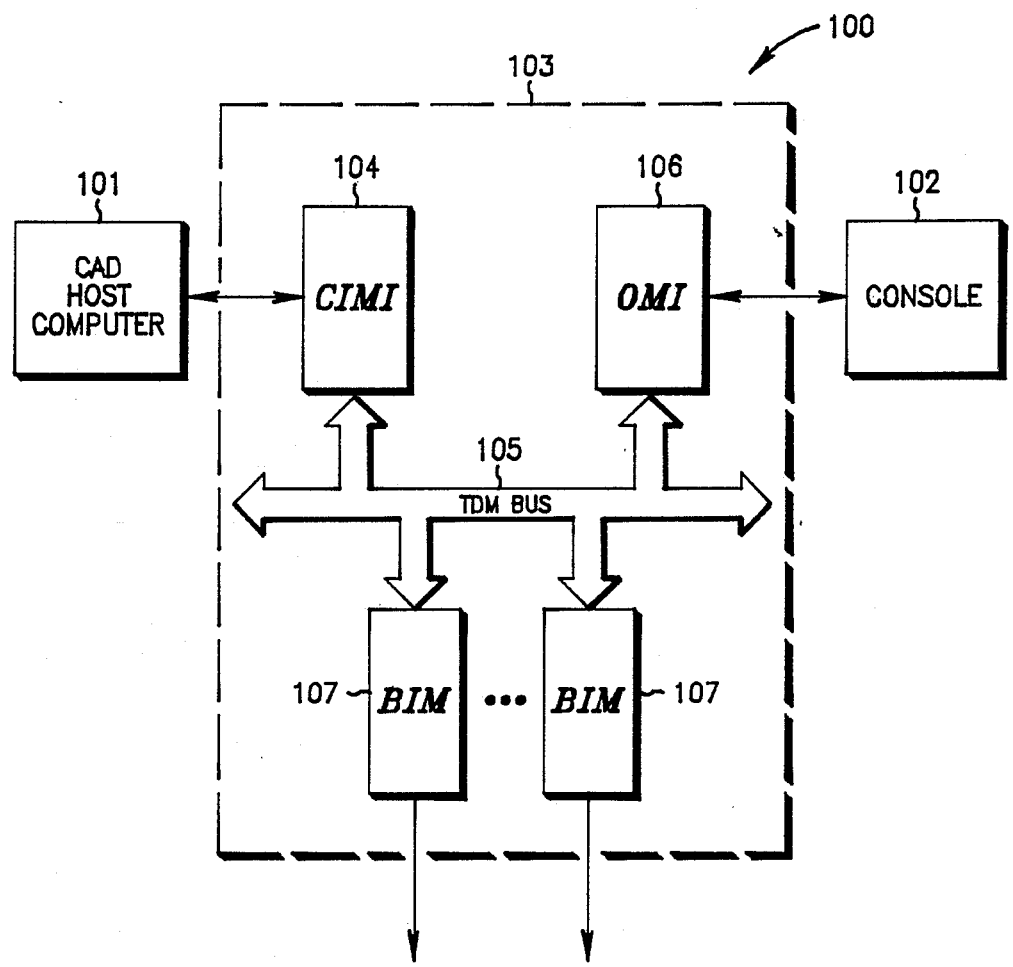
FIG. 1 comprises a block diagram depiction of the invention.

Referring now to the drawings, a computer aided dispatch (CAD) host computer supported radio control console system can be seen as generally depicted by the numeral 100. This system (100) includes generally an appropriate CAD host computer (101), a radio control console (102), and a central electronics bank (CEB)(103) that links the CAD host computer (101) to the console (102).

The CEB (103) includes a CAD interface to MUX interface (CIMI)(104) that receives and sends data to and from the CAD host computer (101) and a TDM bus (105). The console (102) interfaces with the TDM bus (105) (and through it to the other components) through an operator MUX interface (OMI)(106). In addition, base interface modules (BIM)(107) are depicted, which use the radio control channel information from the console (102) to control various base stations, as well understood in the art.

In general, each BIM (107) controls a separate communication path, such as a channel pair. Control information from the CAD host computer (101), and radio control channel instructions and other acknowledgment signals from the console (102), are passed between each other and to other components within the CEB (103) through the appropriate CIMI (104) and OMI (106) via the TDM bus (105). (The general construction and operation of the above components are generally understood by those skilled in the art, and hence will not be described in further detail here. The reader may wish to consider the contents of U.S. Pat. No. 4,698,805 which describes a console interface for a trunked radio system, and which reference is hereby incorporated herein by this reference. Other related information can be found in a document entitled "System Planner For Centracom Series II Control Centers" (Document No. R4-2-37) and "Smartnet Trunked Centracom Series Two Console System Planner" (Document No. R4-2-47), both of which are available from Motorola, Inc., in Schaumburg, Illinois.)

Figure 2:
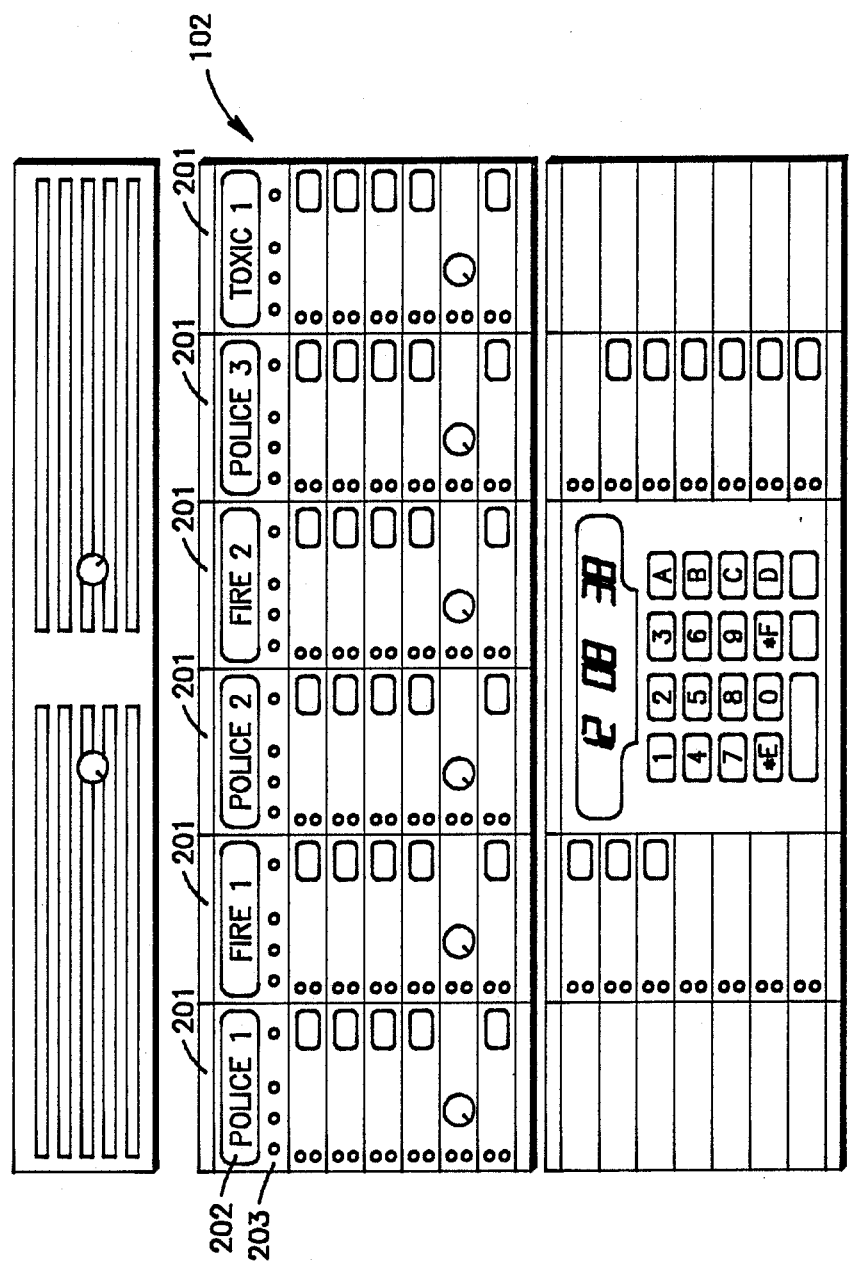
FIG. 2 comprises a front view of a radio control console.

Referring now to FIG. 2, the radio control console (102) will be briefly described. The console includes a plurality of channel control modules (CCM) (201). Each of these CCMs (201) comprises an assignable CCM and includes an alphanumeric display (202) to provide an appropriate indication of the current channel assignment for that particular CCM (201). For example, the first CCM (203) has been assigned to the POLICE 1 group, whereas the second CCM (204) has been assigned to the FIRE 1 group.

These channel assignments can be varied both from the console (102) and from the CAD host computer (101) as required during the course of use. (Additional information regarding such a radio control console, including the assignable CCMs, can be found in copending applications Ser. No. 182,628 filed on Apr. 18, 1988 and entitled "Non-Duplicative Channel Assignment Method For A Control Console" by Timothy McVee, and U.S. Ser. No. 184,218 filed Apr. 21, 1988 entitled "Display Control For A Channel Control Module In A Control Console" by Timothy McVee, Jeffrey Blanchette, Bruce Heyman and Gregory Dertz, and also in a document entitled "System Planner for Centracom Series II Plus Control Centers" (Document No. R4-2-73), which document is available from Motorola, Inc., in Schaumburg, Illinois, all of which are incorporated herein by this reference.)

Figure 3:
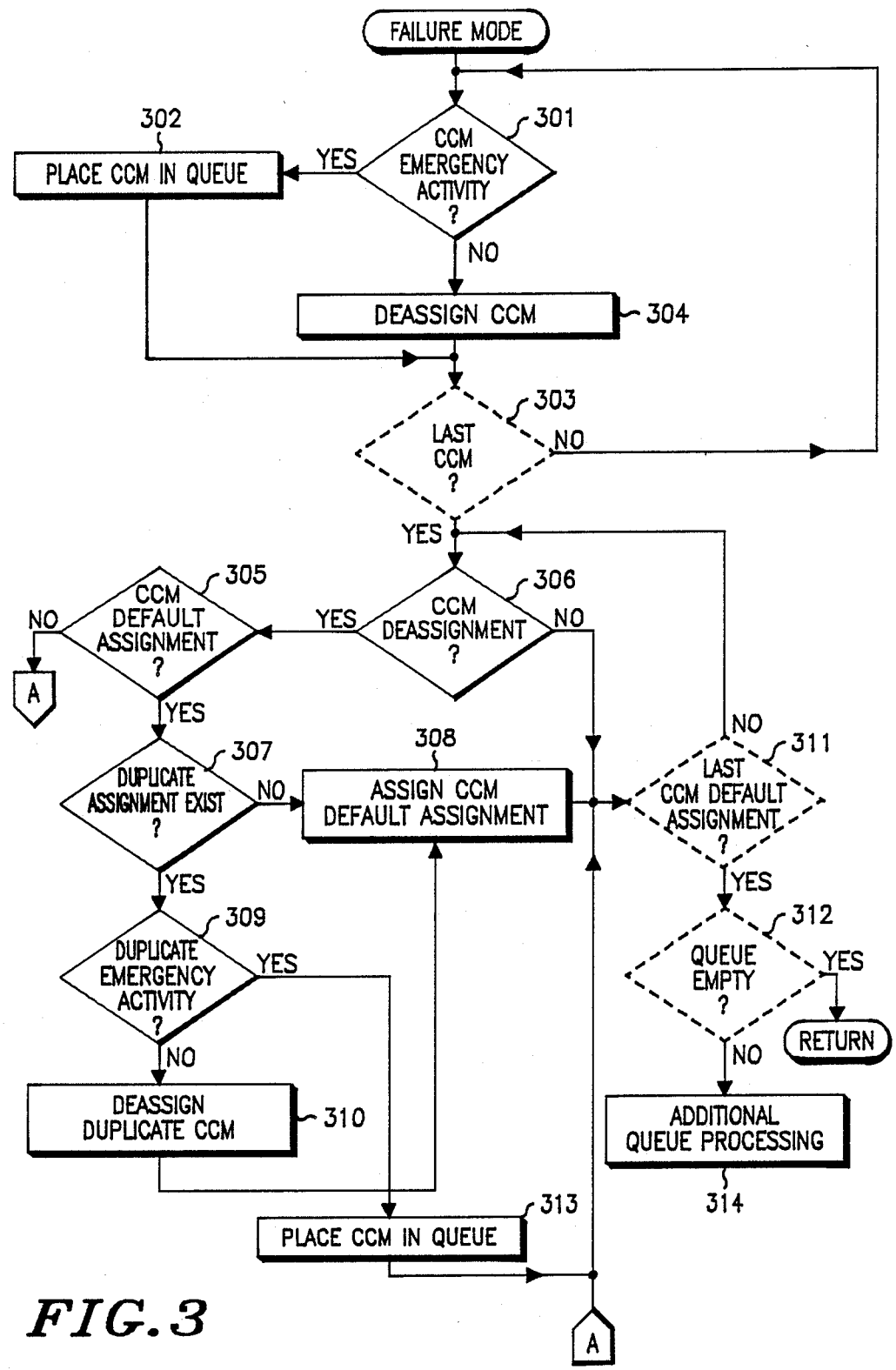
FIG. 3 comprises a flow chart depicting operation of the invention.

To implement this invention, an appropriate software routine can be located in the OMI (106) described earlier with respect to FIG. 1. Upon detecting a failure to receive appropriate control signals from the CAD host computer (101), either due to a failure of the CAD host computer (101) itself or the link connecting the CAD host computer (101) to the console (102), or upon detecting receipt of an appropriate data packet from the CAD host computer (101) so instructing the OMI (106), the OMI (106) will initiate a failure mode of operation. Referring to FIG. 3, the general operation of this failure mode will be described.

Upon initiating the failure mode, the routine will determine, in seriatim fashion, whether any CCMs (201) support an emergency communication (301), and if not, deassign those CCMs (304). (Depending upon the type of communications network supported by the console (102), the emergency communications can be identified in a variety of ways. Typically, emergency calls represent those communications that are initiated in a particular way by a communicating unit, which includes an appropriate call initiation or call maintenance signal that identifies the communication as being of a high priority nature such as an emergency call.) When the routine determines that a particular CCM (201) does support an emergency call, the routine places an identification of that CCM (201) in an appropriate queue (302) to record that the CCM has not completed its failure processing.

As indicated early, if the CCM is not supporting an emergency call, the failure mode routine causes the control console (102) to deassign the CCM (304). For example, with reference to FIG. 2, if the first CCM (203) had originally been assigned to the POLICE 1 group, and was not, at the time of entering the failure mode, supporting an emergency call, the first CCM (203) would not have been placed in the queue, and would be deassigned from the POLICE 1 group. Conversely, if the second CCM (204) were, at the time of entering the failure mode, supporting an emergency call, it would have been listed in the queue and would not have been reassigned by the routine at the point indicated.

Returning again to FIG. 3, the routine then determines whether that CCM (201) has been earlier deassigned by the routine (306). If the CCM in question has not been deassigned, the deassignment has not occurred because the CCM was servicing an emergency call. Therefore, the CCM (201) will not be reassigned and the routine will continue. The routine then determines whether each CCM (201) has a previously established default assignment (305). Each assignable CCM (201) can have associated with it at least one default assignment for use during a failure mode. When a CCM (201) having such a default assignment has been located the routine determines whether a duplicate assignment exists (307).

A duplicate assignment can exist when a default assignment for a first CCM (201) matches the current, and not yet deassigned, assignment for another CCM. If no such default assignment exists, the routine assigns the CCM its appropriate default assignment (308). Otherwise, if a duplicate assignment does exist, the routine determines whether the duplicate CCM has emergency activity (309). If the duplicate does have an active emergency, it will not be deassigned and hence the first CCM will not be assigned to its default assignment. The first CCM will be saved in the queue (313) so that it can be processed later. Otherwise, if the duplicate does not have an active emergency, the duplicate CCM will be deassigned and the original CCM will be assigned to its appropriate default assignment (310).

When all CCMs have been investigated as regarding appropriate default assignments (311), the routine determines whether the queue has emptied. If it has not, the process can be repeated (314) for individual queue listed CCMs. When repeating the process for these queue identified CCMs, the steps described above relating to "Last CCM" (303), "Last CCM Default Assignment" (311), and "Queue Empty" (312) can be deleted, as indicated by the phantom lines that depict those steps. To the extent the emergency calls have terminated in ordinary course, the CCMs can be removed from the queue and deassigned for appropriate reassignment to a default assignment or for quiescent deassigned operation.

If desired, when the failure mode had been intentionally initiated by the CAD host computer (101), an appropriate acknowledgment can be transmitted to the host computer (101) to indicate completion of the deassigning and reassignment tasks. Also, if desired, periodic updates could be sent to the CAD host computer (101) to keep the host apprised of the deassignment and reassignment process as it occurs.

What is claimed:

1. In a system having:
    first control means for providing a control signal;
    second control means for controlling a plurality of communication paths; and
    link means for providing said control signal to said second control means to allow said first control means to influence control of at least some of said plurality of communication paths; an improvement comprising:
    response means responsive to detection of a predetermined event for causing said second control means to control said plurality of communication paths in a predetermined manner, with the exception of any communication paths that are supporting communications having at least a predetermined priority when said response means responds to said detection.

2. The improvement of claim 1 wherein said predetermined event includes detection of a fault regarding receipt of said control signal.

3. The improvement of claim 1 wherein at least some of said plurality of communication paths have a default assignment provided thereto.

4. The improvement of claim 3 wherein said predetermined manner includes assigning said communication paths that have a default assignment to said default assignment, except for those communication paths that are supporting communications having at least said predetermined priority.

5. In a radio communications system having:
CAD host computer means for providing a control signal;
console means for controlling a plurality of radio communication paths; and
link means for providing said control signal to said console means to allow said CAD host computer means to influence control of at least some of said plurality of radio communication paths;
an improvement comprising:
response means responsive to detection of a predetermined event for causing said console means to control said plurality of radio communication paths in a predetermined manner, with the exception of any communication paths that are supporting communications having at least a predetermined priority when said response means responds to said detection.

6. The improvement of claim 5 wherein said predetermined event comprises detection of a fault regarding receipt of said control signal.

7. The improvement of claim 5 wherein at least some of said plurality of radio communication paths have a default assignment provided thereto.

8. The improvement of claim 7 wherein said predetermined manner includes assigning said radio communication paths that have a default assignment to said default assignment, except for any radio communication paths that are supporting communications having at least said predetermined priority.

9. In a system having:
CAD host computer means for providing a control signal;
console means for controlling a plurality of radio communication paths; and
link means for providing said control signal to said console means to allow said CAD host computer means to influence control of at least some of said plurality of radio communication paths;
a method of controlling said plurality of communication paths when a predetermined event occurs, comprising the steps of:
(A) detecting said predetermined event;
(B) upon detecting said predetermined event, causing said console means to control said plurality of radio communication paths in a predetermined manner, with the exception of any communication paths that are supporting communications having at least a predetermined priority when said predetermined event is detected.

10. The method of claim 9 and further including the steps of:
(C) detecting when said radio communication paths that were accepted in step B cease supporting communications having at least said predetermined priority;
(D) upon detecting a radio communication path that ceases to support such a communication, causing said console means to control said radio communication path in said predetermined manner.

11. In a system having:
CAD host computer means for providing a control signal;
console means for controlling a plurality of radio communication paths; and
link means for providing said control signal to said console means to allow said CAD host computer means to influence control of at least some of said plurality of radio communication paths;
a method of controlling said plurality of communication paths when a predetermined event occurs, comprising the steps of:
(A) detecting said predetermined event;
(B) identifying any of said radio communication paths that are supporting communications having at least a predetermined priority;
(C) deassigning at least some of said plurality of radio communication paths, provided that no radio communication paths identified as supporting a communication having at least said predetermined priority are deassigned.

12. The method of claim 11, and further including the step of:
(D) reassigning at least some of said deassigned radio communication paths to a second assignment.

* * * * *